(12) United States Patent
Conrad et al.

(10) Patent No.: US 11,314,022 B2
(45) Date of Patent: Apr. 26, 2022

(54) REMOVABLE SLIDING SHUTTER FOR AN ADAPTER

(71) Applicant: US Conec, Ltd, Hickory, NC (US)

(72) Inventors: Craig M. Conrad, Hickory, NC (US); Darrell R. Childers, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 16/933,894

(22) Filed: Jul. 20, 2020

(65) Prior Publication Data

US 2021/0018698 A1 Jan. 21, 2021

Related U.S. Application Data

(60) Provisional application No. 62/875,617, filed on Jul. 18, 2019.

(51) Int. Cl.
*G02B 6/38* (2006.01)

(52) U.S. Cl.
CPC ......... *G02B 6/3849* (2013.01); *G02B 6/3825* (2013.01); *G02B 6/3893* (2013.01)

(58) Field of Classification Search
CPC .................................................. G02B 6/3849
See application file for complete search history.

(56) References Cited

U.S. PATENT DOCUMENTS

| | | | |
|---|---|---|---|
| 5,506,922 A | 4/1996 | Grois et al. | |
| 5,687,268 A * | 11/1997 | Stephenson | G02B 6/3825 385/73 |
| 7,315,682 B1 | 1/2008 | Lin et al. | |
| 7,340,146 B2 * | 3/2008 | Lampert | G02B 6/3849 385/134 |
| 7,561,775 B2 | 7/2009 | Lin et al. | |
| 7,648,286 B2 | 1/2010 | Nakagawa | |
| 7,841,777 B2 * | 11/2010 | Howard | G02B 6/3849 385/75 |
| 9,798,092 B2 * | 10/2017 | Leigh | G02B 6/3849 |
| 9,927,584 B2 | 3/2018 | Leigh et al. | |
| 2003/0147597 A1 * | 8/2003 | Duran | G02B 6/3825 385/76 |

\* cited by examiner

*Primary Examiner* — Sung H Pak
(74) *Attorney, Agent, or Firm* — Michael L. Leetzow, P.A.; Shubhrangshu Sengupta

(57) ABSTRACT

An adapter that receives fiber optic connectors has a shutter to keep dust and dirt from the fiber optic connectors is capable of rotation as well as translation. The shutter may also be removed from the adapter when not needed. The shutter does not interfere with adjacent adapters or fiber optic connectors and does not need a spring to keep the shutter in a closed position when the adapter does not have a fiber optic connector installed therein.

17 Claims, 11 Drawing Sheets

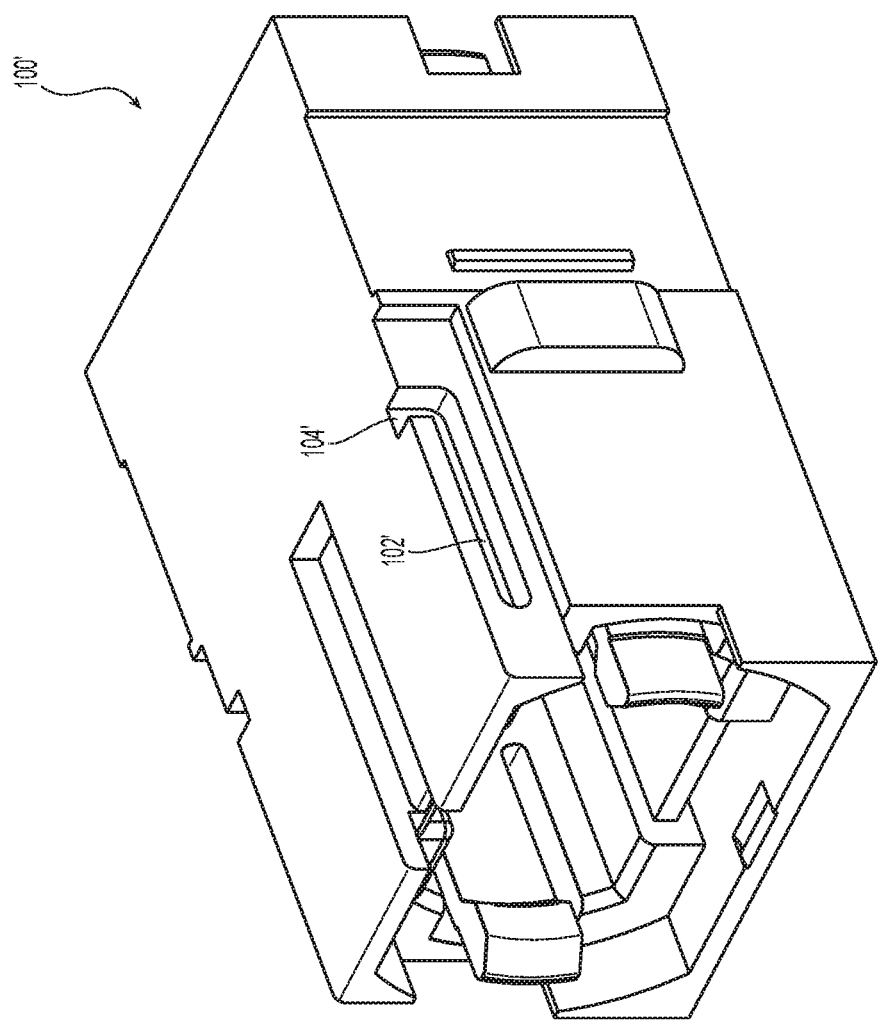

REMOVABLE SLIDING SHUTTER FOR AN ADAPTER

REFERENCE TO RELATED CASE

This application claims priority under 35 U.S.C. § 119 (e) to provisional application no. 62/875,617 filed on Jul. 18, 2019, the contents of which are hereby incorporated by reference in their entirety.

BACKGROUND OF THE INVENTION

Fiber optic connectors are designed to be mated with other fiber optic connectors. The mating of the fiber optic connectors on a panel is typically done with two fiber optic connectors and an adapter inserted into the panel. The two fiber optic connectors are inserted from opposing ends of the adapter. Usually, this involves two SC-type fiber optic connectors, but other forms are also used. With the increase in the need for mating fiber optic connectors, more fiber optic connectors are being installed in the same space as before. Therefore, there is a premium placed on the space where the connections occur. Fiber optic connectors are becoming smaller and the spacing between them is also getting smaller. Indeed, the adapters that are inserted into the panels are becoming smaller and have less space between them.

There are a number of different adapters that are available to an engineer designing the space. Some of the adapters have shutters to prevent dust, dirt and debris from entering the system. These shutters are typically spring loaded to keep them closed when no fiber optic connector is inserted into that adapter. Closed shutters prevent the dust from entering the system and prevent any accidental exposure to laser beams from other fiber optic connectors, among other issues. However, they may also require a bit of force to open them, they take up the valuable space, and they increase the cost and the complexity of the system.

Thus, there is a need for a shutter that is low cost, easy to operate, seals off the opening in the adapter, and does not take up a lot of room when there is a fiber optic connector installed in the adapter.

SUMMARY OF THE INVENTION

The present invention is directed to a fiber optic connector adapter that includes a main body having an opening for receiving a fiber optic connector, a shutter for sealing the opening in the main body when a fiber optic connector is not inserted into the opening, the shutter having a pin on opposing side edges, a pair of slots on the main body, each of the pair of slots to receive one of the pins, and a groove in a top surface of the main body to receive a projection on an inside surface of the shutter.

In some embodiments, the main body has two side walls and a top wall and a rail extending along at least a portion of each of the side walls.

In some embodiments, each of the pins is disposed on an extension of a side arm that extends from a side edge of the shutter.

In other embodiments, the shutter is capable of rotation and translation relative to the main body of the adapter.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 11 is a perspective view of another embodiment of an adapter for fiber optic connectors that has a shutter that is removable using cut-outs in the adapter.

DETAILED DESCRIPTION OF THE INVENTION

Figure 1:
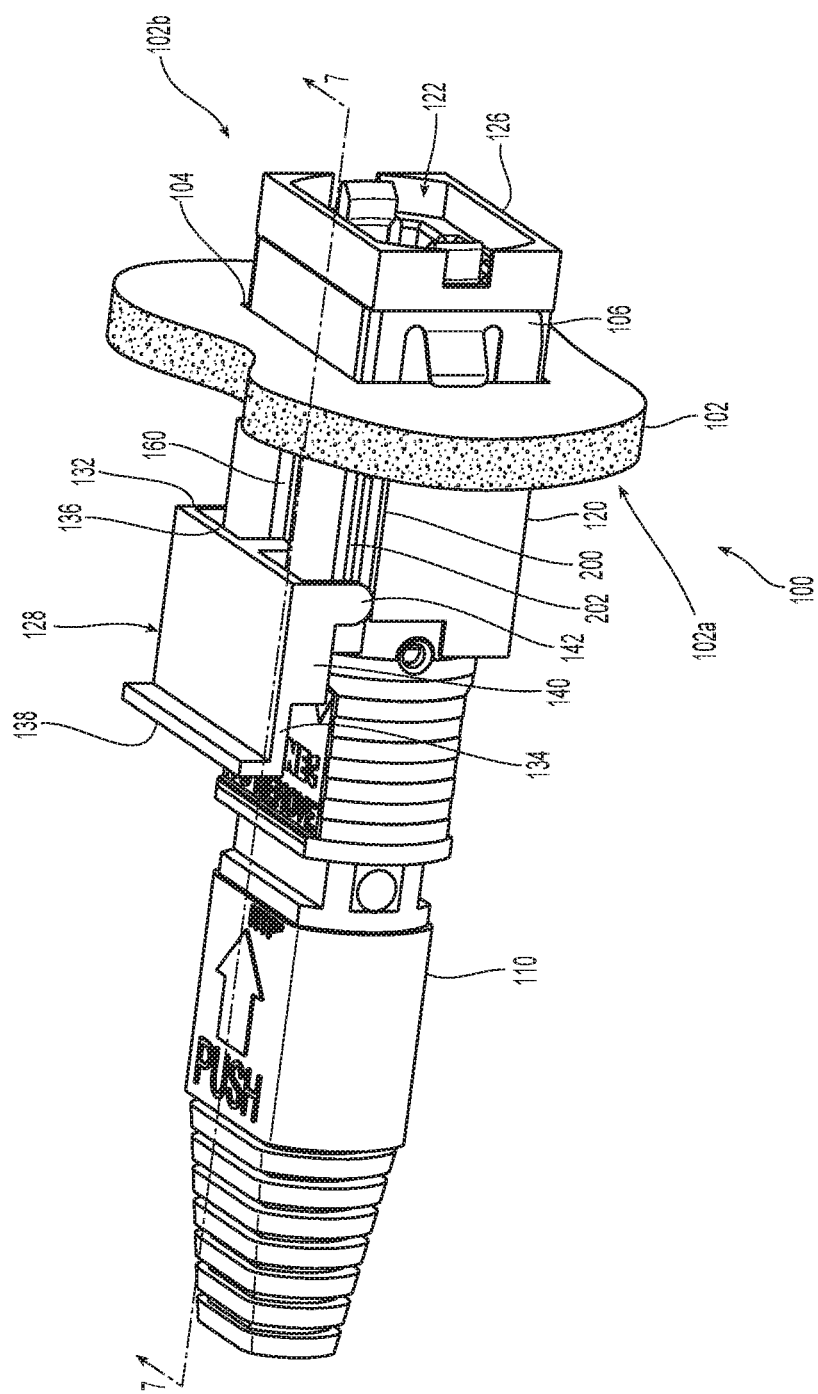
FIG. 1 is a perspective view of one embodiment of an adapter and a shutter according to the present invention, the adapter installed in a panel and having a fiber optic connector therein.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
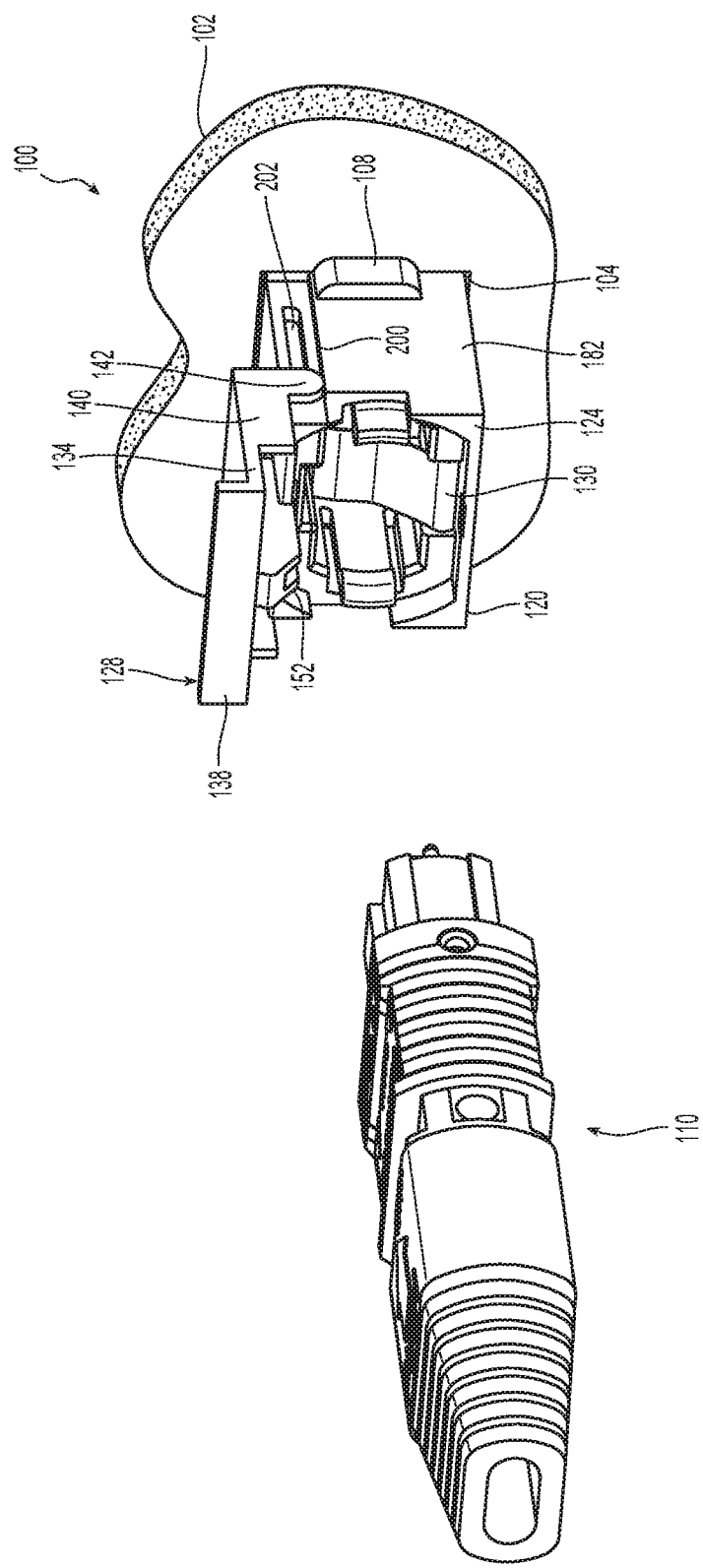
FIG. 2 is a perspective view of the adapter in FIG. 1 with the fiber optic connector removed.

FIGS. 1 and 2 illustrate one embodiment of an adapter 100 according to the present invention and its relationship to a panel 102. The panel 102 has a front side 102a and a rear side 102b. The adapter 100 is inserted from the front side 102a of the panel 102 into an opening 104 in the panel. The adapter 100 may have an adapter clip 106 to removably secure the adapter 100 in the panel 102. There may be other structures that are also used to secure the adapter 100 in the panel 102. For example, there may be a flange 108 on the adapter 100 that prevents the adapter 100 from be pushed through the panel 102. The flange 108 may be on one or more sides of the adapter 100, or may be on the top and/or bottom surfaces of the adapter 100, or both. The adapter 100 is used to mate two fiber optic connectors 110, one from the front side 102a of the panel 102 (in this case, fiber optic connector 110) and a fiber optic connector from the rear side 102b (not shown).

The adapter 100 has a main body 120 with an opening 122 that extends along a longitudinal axis A from a front end 124 to a rear end 126 to receive the fiber optic connectors 110. The shutter 128 is attached to the main body 120 of the adapter 100 at the front end 124. The shutter 128 has rotational and translational movement relative to the main body 120 as described in more detail below. Within the opening 122 is preferably a light shield 130. The light shield 130 protects a user from wayward light beams that may be going in a direction from the rear side 102b of the panel towards the front side 102a (see FIG. 1) from a fiber optic connector 110 that has already been inserted into the adapter 100 from the rear side 102b or from the right in FIG. 1. The light shield 130 may be removable from the adapter 100 and it may also be moved by the shutter 128 when the shutter 128 is closed or opened. As is known in the art, when a fiber optic connector 110 is inserted into the opening 122, the fiber optic connector 110 pushes the light shield 130 out of the way of the mating of the two fiber optic connectors 110 that are inserted from each side of the adapter 100.

The shutter 128 extends between two side edges 132,134, a top edge 136 and a bottom edge 138. See also FIGS. 3 and 8. Each of the side edges 132,134 may have a side arm 140 and an extension 142 to position a pin 144 relative to the shutter 128. The pins 140 engage the main body 120 of the adapter 100. The configuration of the shutter 128, the side arm 140 and the extensions 142 could be different so long as the pins 140 are disposed to engage the main body 120 of the adapter 100 as discussed below.

The shutter 128 also has an inside surface 150 that extends between the two side edges 132,134, the top edge 136 and the bottom edge 138. On the inside surface 150 there is a projection 152 that extends away from the shutter 128 and into the opening 122 when the shutter 128 is closed. See FIGS. 2, 6, and 8. The projection 152 assists with the rotational and translational movement of the shutter 128 as well as the insertion of the fiber optic connector 110 into and out of the adapter 100. The projection 152 has chamfered surfaces or ramps 154 adjacent to the bottom edge 138. The chamfered surfaces 154 allow for movement of the shutter 128 either up or down, depending on whether the fiber optic connector 110 is being inserted or removed, respectively. For example, if the fiber optic connector 110 is being inserted and the shutter 128 is not fully rotated out of the way (in a manner similar to that shown in FIG. 4), the fiber optic connector 110 may engage the chamfered surfaces or ramps 154 on the projection 152, which would cause the shutter 128 to be further rotated upward. Similarly, if the fiber optic connector 110 is being removed and the shutter 128 is not fully rotated out of the way, the chamfered surfaces or ramps 154 will prevent the fiber optic connector from being snagged or held-up on the shutter 128, assisting in the removal.

Figure 5:
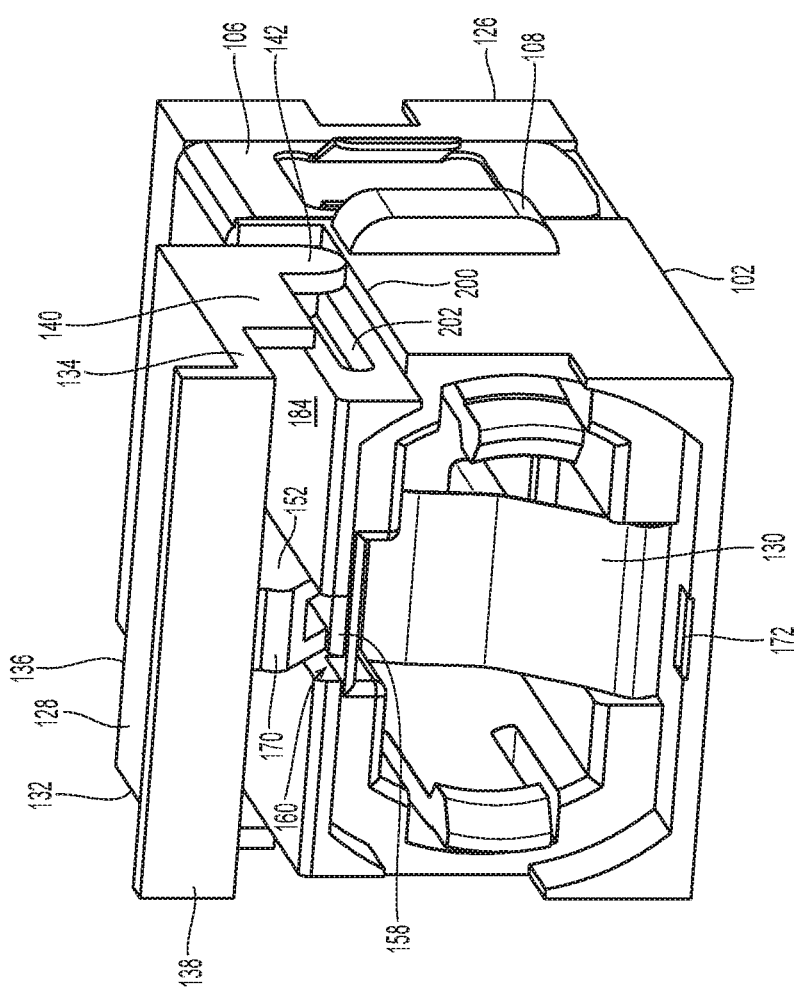
FIG. 5 is a perspective view of the adapter and shutter in FIG. 4 after rotation and translation.
Figure 6:
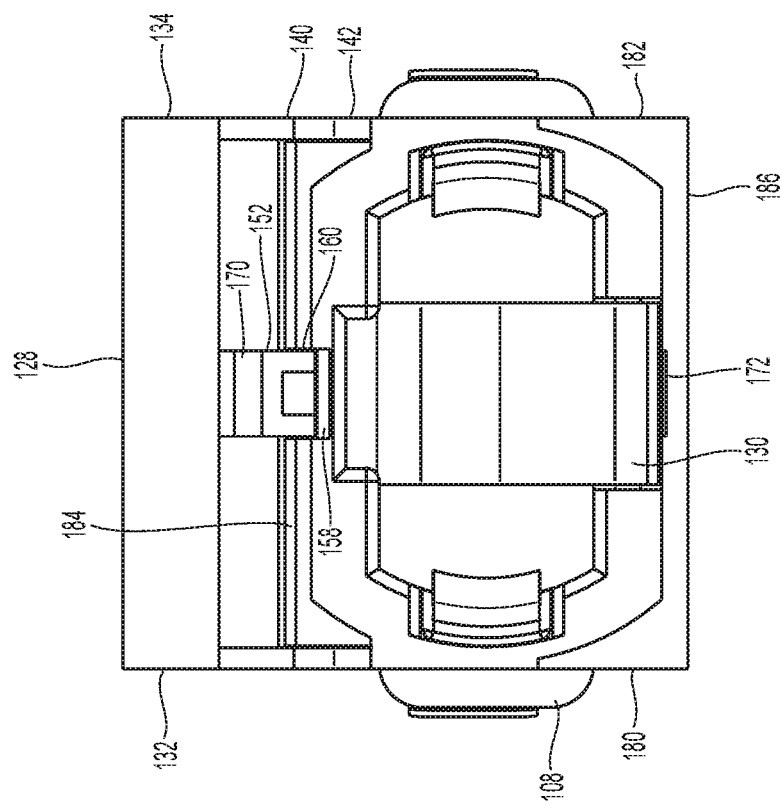
FIG. 6 is front elevational view of the adapter and shutter in FIG. 4 with the shutter completely open.
Figure 7:
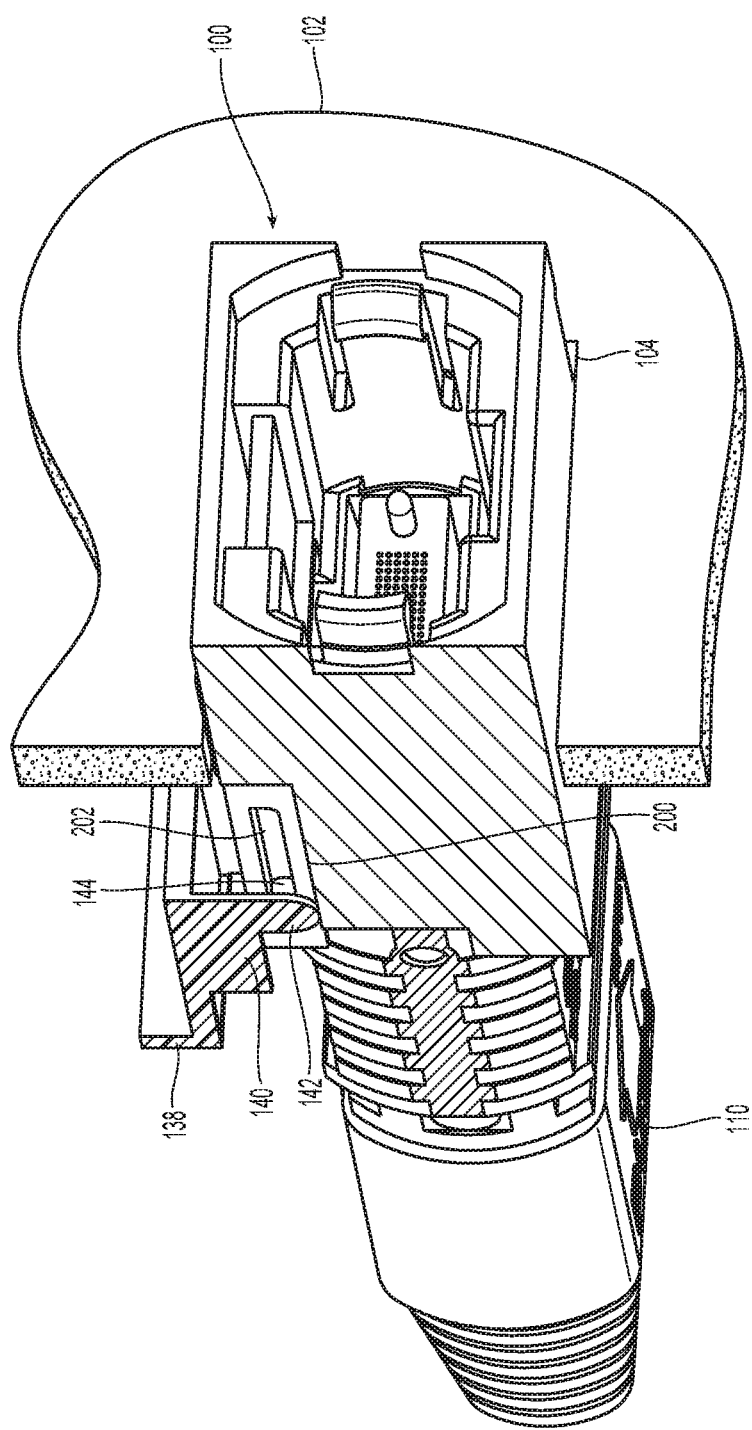
FIG. 7 is a perspective view of a partial cross section from the front of the adapter and shutter in FIG. 1.
Figure 8:
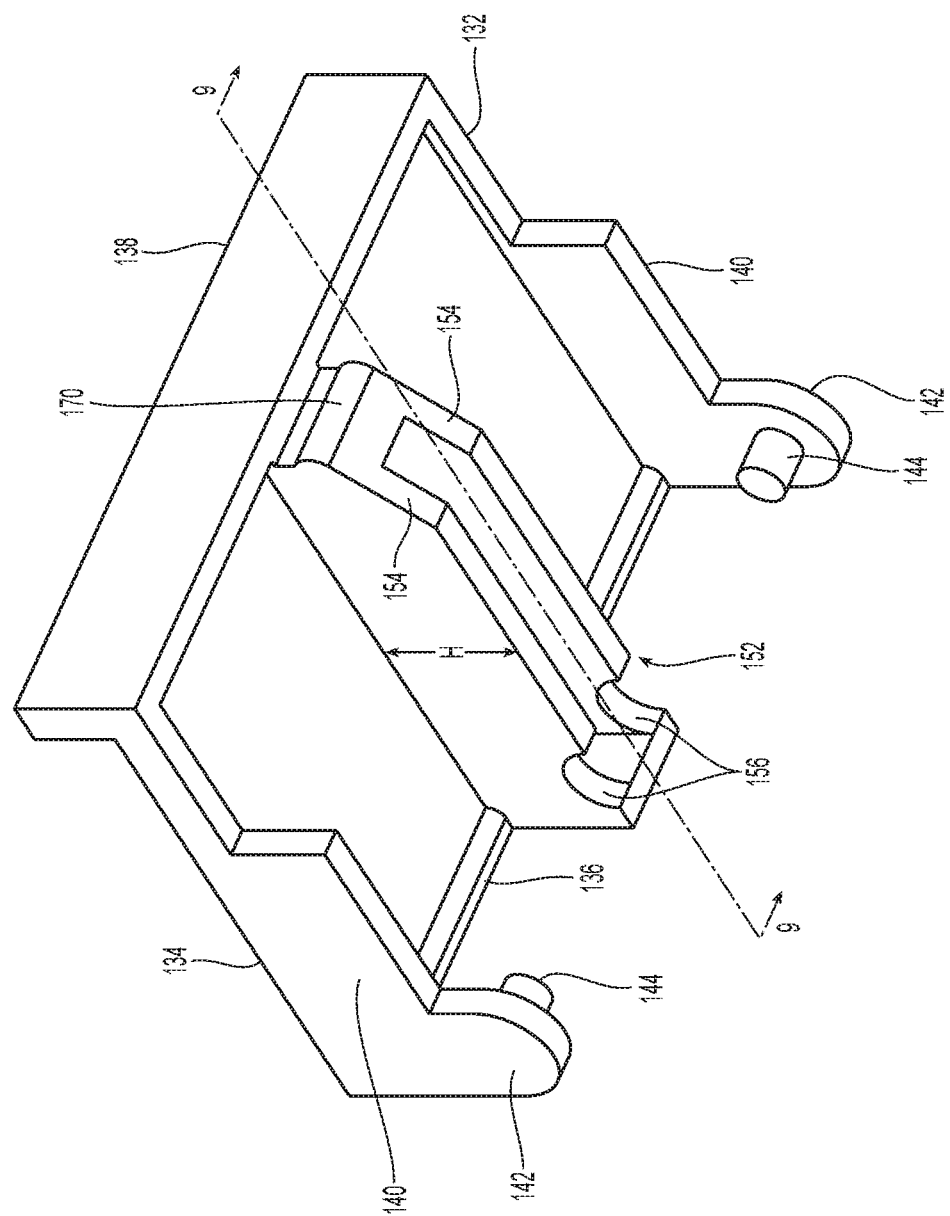
FIG. 8 is a perspective view of the underside of the shutter in FIG. 1.
Figure 9:
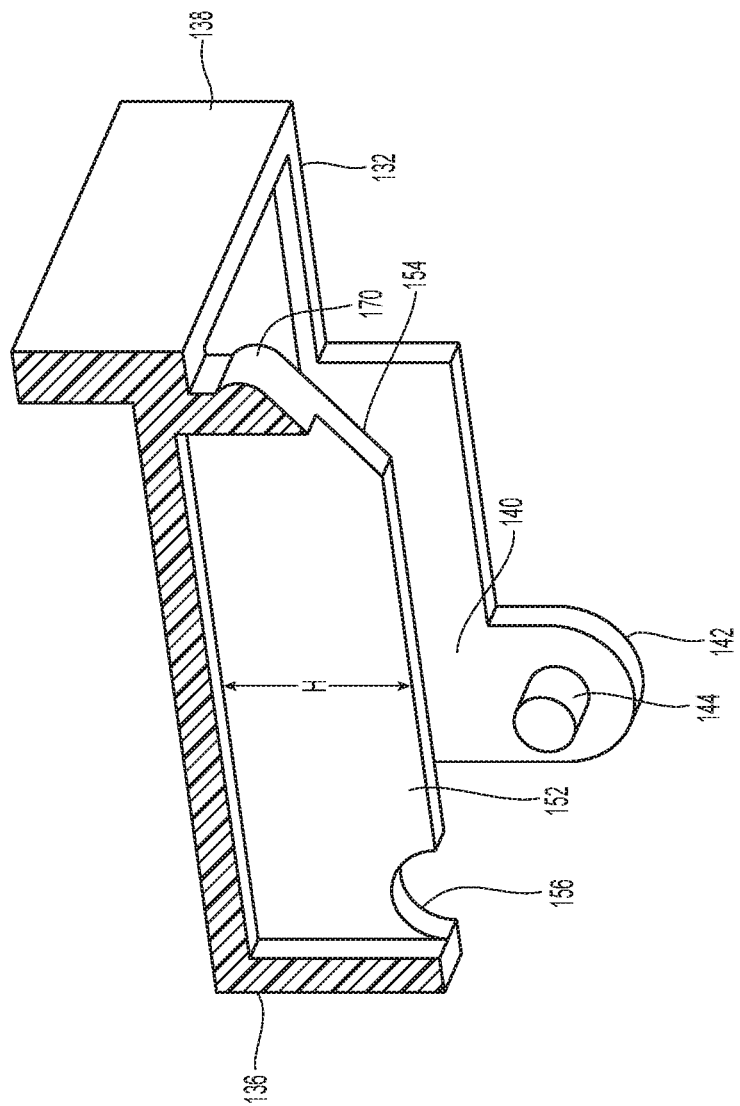
FIG. 9 is a cross section view of the shutter along the lines 9-9 in FIG. 8.
Figure 10:
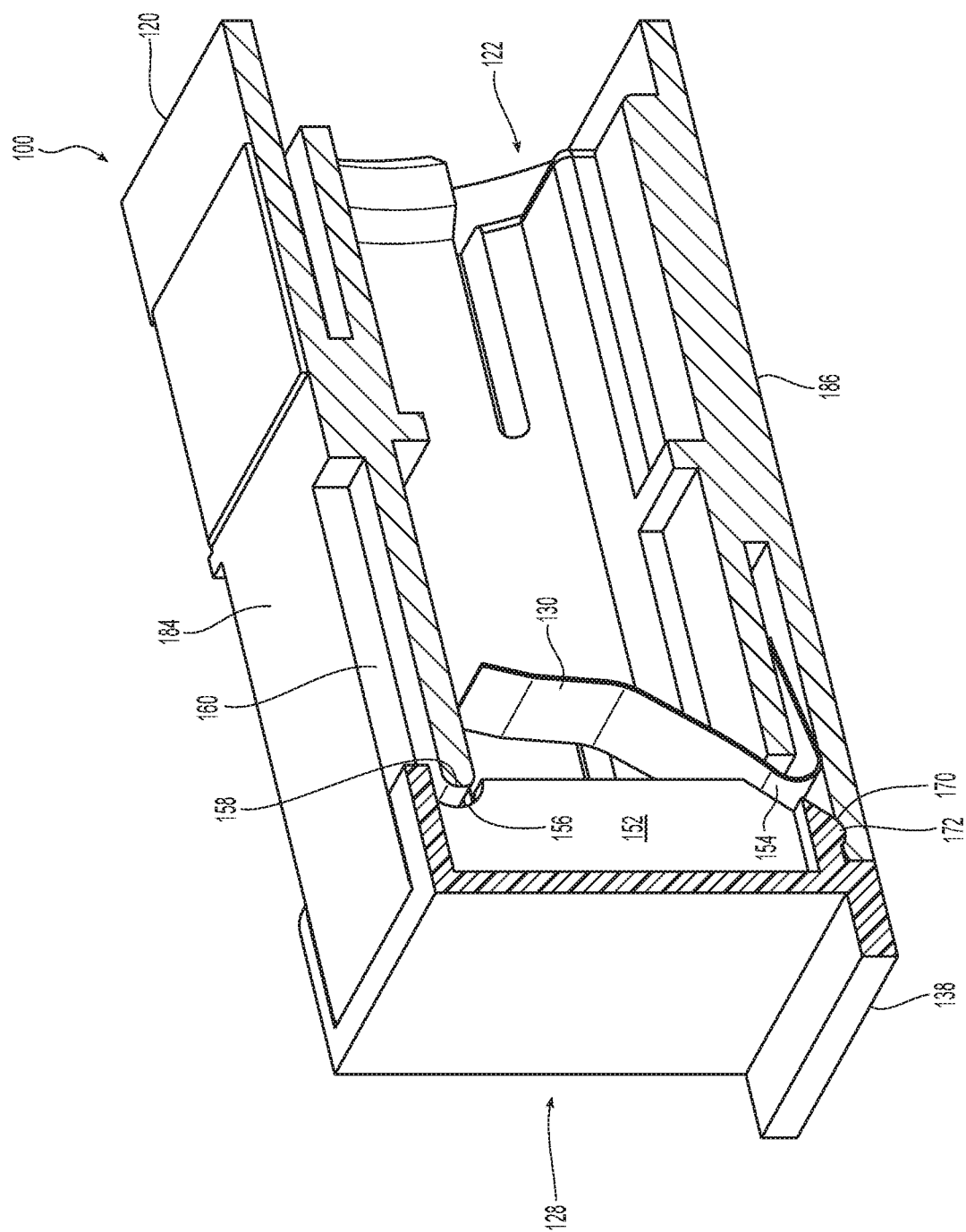
FIG. 10 is a view of a cross section of the adapter and shutter according to the present invention and along the lines 10-10 in FIG. 3.

The projection 152 also has cut-outs 156 that engage an edge 158 of the adapter 100 inside the opening 122. The cut-outs 156 are illustrated in FIGS. 8 and 9 and the edge 158 (preferably a rounded edge) can be seen in FIG. 10. The edge 158 is the beginning of a groove 160 that extends from adjacent the opening 122 toward the center of the main body 120. In the fully open position (rotated and translated), the projection 152 is disposed at least partially within the groove 160. See also FIGS. 5 and 6. As the shutter 128 is moved back to the closed position, the projection 152 slides (translation) along the groove 160 until the cut-outs 156 are positioned at the edge 158. At this point, the shutter 128 is allowed to rotate downward with the edge 158 in the cut-outs 156. The shutter 128 stops the translation motion and begins the rotation movement. The shutter 128 rotates until the inside surface 150 engages the front end 124 of the main body 120, thereby sealing the opening 122 from the front side. The groove 160 may be as deep as needed (obviously not deeper than the height H of the projection 152). FIGS. 5 and 6.

The projection 152 is illustrated as having two side portions 162 and an open center portion 164. The spacing of the side portions 162 allows for more support for the shutter 128 and therefore smoother operation of the shutter in opening and closing. This also reduces the weight and the cost of materials to make the shutter 128. Alternatively, there could be a unitary projection without the open center portion 164.

The projection 152 also has a latch 170 that is between the chamfered surfaces or ramps 154 and the bottom edge 138. The latch 170 is configured to engage a depression 172 in the opening 122 of the main body 120. The latch 170 is a bump or projection, but could take other shapes. As the shutter 128 is rotated to the closed position, the latch 170 engages the depression 172 to retain the shutter in a locked position. See, e.g., FIGS. 8 and 10. As a result, a bit of a force is required to move the latch 170 out of the depression 172 to open the shutter 128. That is, the shutter 128 cannot open simply under gravity, e.g., when tilted.

The main body 120 of the adapter 100 has two side walls 180,182, a top wall 184 and a bottom wall 186, the walls defining the opening 122. See in particular FIGS. 3 and 6. Within the opening 122 there may also be structures (i.e., latches) to engage the fiber optic connector 110. See FIG. 2. The latches are well known in the art and will not be described further here.

Figure 3:
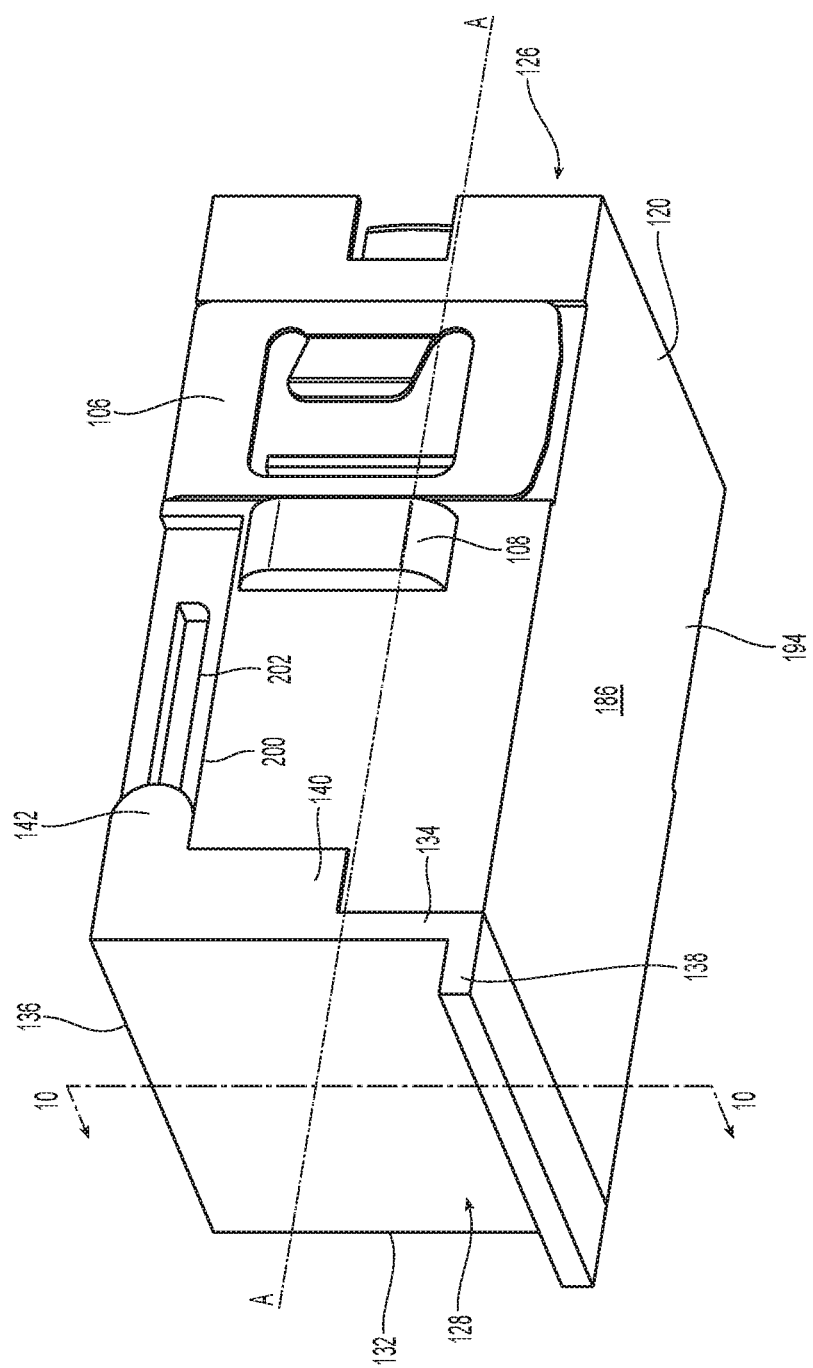
FIG. 3 is a perspective view of the shutter and adapter FIG. 1, the adapter removed from the panel and the shutter closed.
Figure 4:
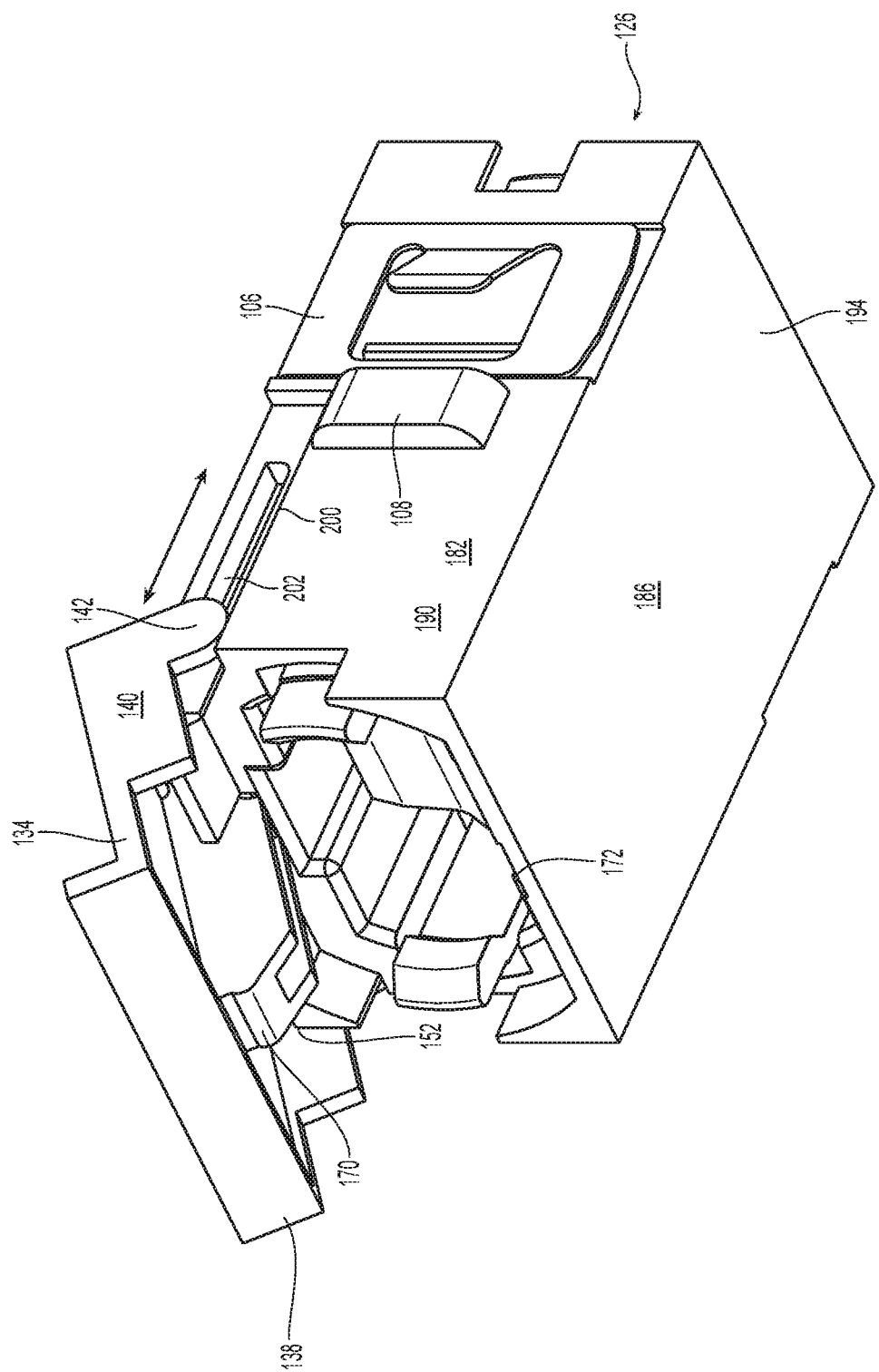
FIG. 4 is a perspective view of the adapter and shutter in FIG. 3, with the shutter partially open.

The side walls 180,182 each have an outside surface 188,190, respectively. The top wall 184 also has an outside surface 192, while the bottom wall 186 has an outside surface 194. See also FIG. 4. As noted above, the main body 120 has a groove 160 that is disposed in the top wall 184. The bottom wall has the latch 170. Each of the side walls 180,182 has a rail 200 that extends from the front end 124 towards the center of the adapter 100. The rail 200 has a width that is the same as that of the side arm 140 and an extension 142. See FIGS. 2 and 5. As can be seen in FIGS. 3-5, as the shutter 128 is moved along the main body 120, the side arm 140 and the extension 142 are disposed in the rail 200. With this configuration, the width of the adapter 100 and the shutter 128 is the same along the height of the side walls 180,182. Thus, the addition of the shutter 128 to the adapter 100 does not take any more space that just the adapter 100 by itself. The side walls 180,182 also have a slot 202 that is generally coextensive with the rail 200. The slots 202 receive the pin 144, which guides the translational movement of the shutter 128 on the main body 120. The slots 202 are disposed between the rails 200 and the top wall 184 and the outside surface 192 in particular. The shutter 128 is removable from the adapter 100 by pinching the side arms 140, which causes the pins 144 to flex outward and out of the slots 202. The shutter 128 can then be easily removed.

An alternative embodiment of an adapter 100' is illustrated in FIG. 11. In this embodiment, the slots 202' may have a cut-out 204' that would allow the pins 144 to be removed by sliding the pins 144 out of the cut-out 204'. This feature would prevent the need to pinch the side arms of the shutter to remove the shutter.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic connector adapter comprising:
   a main body having an opening for receiving a fiber optic connector;
   a shutter for sealing the opening in the main body when a fiber optic connector is not inserted into the opening, the shutter having a pin on opposing side edges;
   a pair of slots on the main body, each of the pair of slots to receive one of the pins; and
   a groove in a top surface of the main body to receive a projection on an inside surface of the shutter.

2. The fiber optic connector adapter according to claim 1, wherein the main body has two side walls, a top wall and a bottom wall, each of the walls having outside surfaces, wherein the shutter has two side edges, a top edge and a bottom edge, and wherein the side edges are coextensive with the outside surface of the side walls, the top edge is coextensive with the top wall, and the bottom edge is coextensive with the bottom wall.

3. The fiber optic connector adapter according to claim 1, wherein the main body has two side walls and a top wall and a rail extending along at least a portion of each of the side walls.

4. The fiber optic connector adapter according to claim 3, wherein each of the slots is disposed between the top wall and the rail.

5. The fiber optic connector adapter according to claim 1, wherein each of the pins is disposed on an extension of a side arm that extends from a side edge of the shutter.

6. The fiber optic connector adapter according to claim 5, wherein an edge of the extension moves along the rail as the shutter is moved between a first position and a second position.

7. The fiber optic connector adapter according to claim 6, wherein the first position is when inside surface of the shutter is perpendicular to a longitudinal axis through the opening and the second position is when the inside surface of the shutter is parallel to the longitudinal axis through the opening.

8. The fiber optic connector adapter according to claim 1, wherein the shutter is capable of rotation and translation relative to the main body of the adapter.

9. The fiber optic connector adapter according to claim 1, wherein the projection has a chamfered surface at a bottom edge.

10. The fiber optic connector adapter according to claim 1, wherein the projection has cut-outs to receive a portion of the main body during rotation.

11. The fiber optic connector adapter according to claim 1, further comprising a light shield disposed within the opening of the main body.

12. The fiber optic connector adapter according to claim 11, wherein the light shield is removably attached to the adapter.

13. The fiber optic connector adapter according to claim 11, wherein the shutter has a latch extending along at least a portion of the shutter.

14. The fiber optic connector adapter according to claim 13, wherein the latch is disposed on the projection.

15. The fiber optic connector adapter according to claim 13, wherein the projection slides in the groove when the pins slide in the slots.

16. The fiber optic connector adapter according to claim 13, wherein the shutter is removable from the main body.

17. The fiber optic connector adapter according to claim 13, wherein the slots have a cut-out to allow for the removal of shutter without deforming the shutter.

* * * * *